US007018081B2

(12) United States Patent
Hopkins

(10) Patent No.: US 7,018,081 B2
(45) Date of Patent: Mar. 28, 2006

(54) POLE LIGHT INCLUDING NAVIGATION LIGHT AND ULTRAVIOLET LIGHT SOURCE

(76) Inventor: Timothy Nevin Hopkins, 2517 Patton Hollow Rd., Watertown, TN (US) 37184

( * ) Notice: Subject to any disclaimer, the term of this patent is extended or adjusted under 35 U.S.C. 154(b) by 19 days.

(21) Appl. No.: 10/465,145

(22) Filed: Jun. 19, 2003

(65) Prior Publication Data

US 2004/0257822 A1 Dec. 23, 2004

(51) Int. Cl.
*B60Q 1/02* (2006.01)

(52) U.S. Cl. ...................... 362/477; 362/431; 362/652; 362/293; 362/510; 362/540

(58) Field of Classification Search ................ 362/477, 362/431, 231, 84, 260, 263, 293, 510, 540, 362/647, 652, 267, 657, 658, 659; 340/985
See application file for complete search history.

(56) References Cited

U.S. PATENT DOCUMENTS 3,619,600 A * 11/1971 Kryder ....................... 362/222
3,838,267 A 9/1974 Eggers et al.
4,884,173 A 11/1989 Cassidy
5,175,437 A 12/1992 Waluszko
5,317,488 A 5/1994 Penrod
5,339,225 A 8/1994 Wiggerman
5,417,438 A * 5/1995 Poff ........................... 473/415
5,491,621 A 2/1996 Duty
5,504,342 A 4/1996 Jaynes et al.
5,704,704 A 1/1998 Reichard et al.
5,730,079 A 3/1998 Totty et al.
5,860,730 A * 1/1999 Hesprich .................... 362/226
6,062,713 A * 5/2000 Renlger et al. ............. 362/477
6,139,170 A * 10/2000 Wiggerman ................. 362/477
6,174,078 B1 * 1/2001 Ohm et al. ................. 362/477
D458,339 S 6/2002 Cheong
6,415,732 B1 * 7/2002 Delorenzo .................. 114/343
6,474,851 B1 * 11/2002 Baley ......................... 362/477
6,592,240 B1 * 7/2003 Camarota et al. ........... 362/399
6,644,829 B1 11/2003 Tracy et al.
6,729,738 B1 * 5/2004 Fuwausa et al. .............. 362/84
6,848,815 B1 * 2/2005 Born .......................... 362/477

* cited by examiner

*Primary Examiner*—Thomas M. Sember
(74) *Attorney, Agent, or Firm*—Eric Karich

(57) ABSTRACT

A pole light has a substantially tubular pole having two ends, a navigation light mounted at one end of the pole, and an ultraviolet light source positioned within the pole. The pole light is operable to emit ultraviolet light in an outward direction from the pole.

15 Claims, 8 Drawing Sheets

300 308 302 310 312 322 304 4 4 306 326 324 328 324 330 314 318 320 316
BOAT ELECTRICAL POWER

304 D 400 402 326 328 W 304
400
402
D
326
328
W 500
314
SWITCH
322
POWER
COND.
CIRCUIT
324
BOAT
ELECTRICAL
POWER
320
318
NAV.
LIGHT
302
UV
LIGHT
SOURCE
326

POLE LIGHT INCLUDING NAVIGATION LIGHT AND ULTRAVIOLET LIGHT SOURCE

BACKGROUND OF THE INVENTION

1. Field of the Invention

This invention relates generally to watercraft, and more particularly to light producing sources for watercraft.

2. Description of Related Art

In locations where the sun shines brightly for several hours during the day and water temperatures rise to levels game fish find uncomfortable, the game fish are typically most active during low light periods and retreat to deeper water during the heat of the day. At the same time, fishing in bright sunlight on a hot day quickly becomes uncomfortable for fishermen, and also requires that all exposed skin be carefully and adequately protected from prolonged exposure to the sun. For this and other reasons, many fishermen in such locations prefer to fish at night.

At the same time, fishing is a very visual activity. Sources of light capable of illuminating large areas are prohibitively heavy and bulky, and bright visible light tends to attract bothersome insects. On the other hand, working by weaker sources of light (e.g., flashlights) is often frustratingly difficult and quickly leads to eye strain and fatigue.

Fisherman have discovered that most monofilament fishing line is fluorescent, and glows brightly in the dark even under relatively low energy sources of "black" (ultraviolet) light. In addition, high visibility monofilament fishing lines with additional levels of phosphors that fluoresce in strong sunlight and/or black light have been developed to meet the demands of fishing conditions when highly visible line is needed. (As the sources of ultraviolet light are relatively weak and water absorbs ultraviolet light, portions of monofilament line under water are typically invisible.)

Many fishermen prefer to fish in groups, and fishermen in close proximity must be able to see their line as well as the lines of the other fishermen around them to prevent the lines from becoming entangled. In addition, fisherman often rely on visual detection of line movement, rather than physical tugs on the line, to detect fish running with baits. Again, monofilament fishing line glowing brightly in the dark under ultraviolet light is easy to see. In addition, tying or otherwise connecting lures to the brightly glowing monofilament line is made easier. Further, many fishermen report that when fishing at night with a black light depth perception is improved and eye strain and fatigue are reduced.

In the United States, U.S. Coast Guard Navigation Rules require that boats illuminate navigation lights during periods of restricted visibility (e.g., at night) to prevent collisions. For example, powerboats measuring less than 39 feet in length must show a red side light to a left (port) side, and green side light to a right (starboard) side, from dead ahead to 112.5 degrees to the rear (aft), and a white "all-around" light visible for 360 degrees. The red and green side lights must be visible for at least one nautical mile, and the white all-around light must be visible for at least two nautical miles.

A typical small powerboat has a single "bi-color" navigation light located on a front portion (bow) that combines both side lights in a single fitting with one bulb, and a white navigation light mounted on a staff in a rear portion (stern).

SUMMARY OF THE INVENTION

The present invention teaches certain benefits in construction and use which give rise to the objectives described below.

The present invention provides a pole light that includes a substantially tubular pole having two ends, a navigation light mounted at one end of the pole, and an ultraviolet light source positioned within the pole. The pole light is operable to emit ultraviolet light in an outward direction from the pole.

A primary objective of the present invention is to provide a pole light having advantages not taught by the prior art.

Another objective is to provide a pole light that includes a UV light source.

Another objective is to provide a UV light source that is protected in a waterproof case.

A further objective is to provide a UV light that is substantially vertical in orientation.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
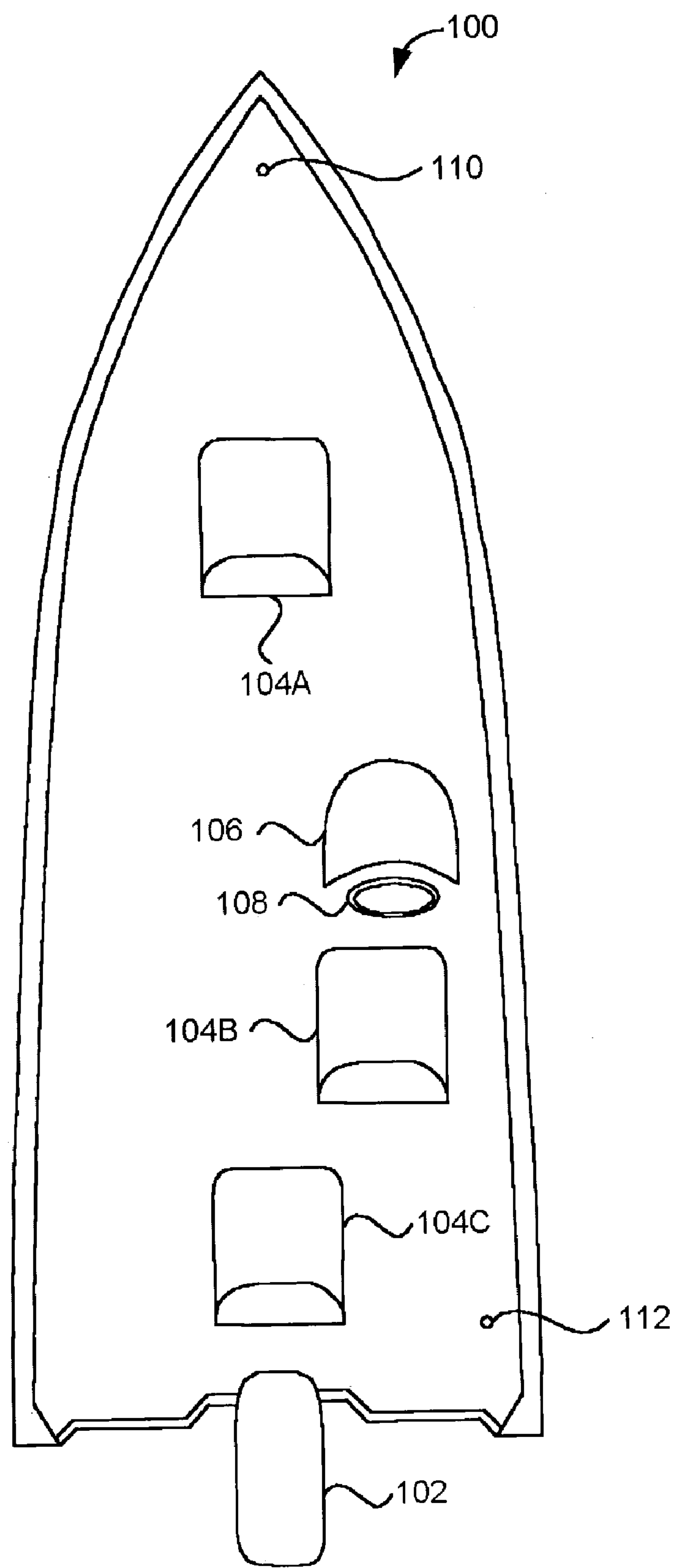
FIG. 1 is a top plan view of one embodiment of a boat including a first base in a center of a front (bow) section adapted for receiving an end of a bi-color pole light, and a second base on a right (starboard) side of a rear (stern) section adapted for receiving an end of an all-around pole light.

FIG. 1 is a top plan view of one embodiment of a boat 100 having an outboard motor 102 attached. The boat 100 of FIG. 1 is typically used for fishing and is commonly referred to as a "bass boat." Such bass boats typically have lengths of less than about 20 feet.

The boat 100 of FIG. 1 has 3 seats 104A–104C and a console 106. The console includes a steering wheel 108 for steering the boat 100. The seat 104B is positioned behind the steering wheel 108, and allows an operator of the boat 100 to sit behind and turn the steering wheel 108.

The seats 104A and 104C are elevated above surrounding surfaces (i.e., decks) to provide ample room around users sitting in the seats and fishing with rods and reels. The seats 104A and 104C are also swivel mounted to allow the users to change facing directions and fish from either side of the boat 100.

In the embodiment of FIG. 1, the boat 100 also includes a first base 110 in a center of a front (bow) section adapted for receiving an end of a bi-color pole light and a second base 112 on a right (starboard) side of a rear (stern) section adapted for receiving an end of an all-around pole light. (See the navigational light requirements described above.) The bases 110 and 112 each include an electrical connector for providing electrical power to the corresponding pole lights.

In the embodiment of FIG. 1, an outer hull of the boat 100 is formed substantially from aluminum. Aluminum has many desirable qualities for boats, including light weight, durability, and resistance to corrosion. However, the hull of the boat 100 may also be formed from fiberglass, wood, or any other material that can be made waterproof.

Figure 2:
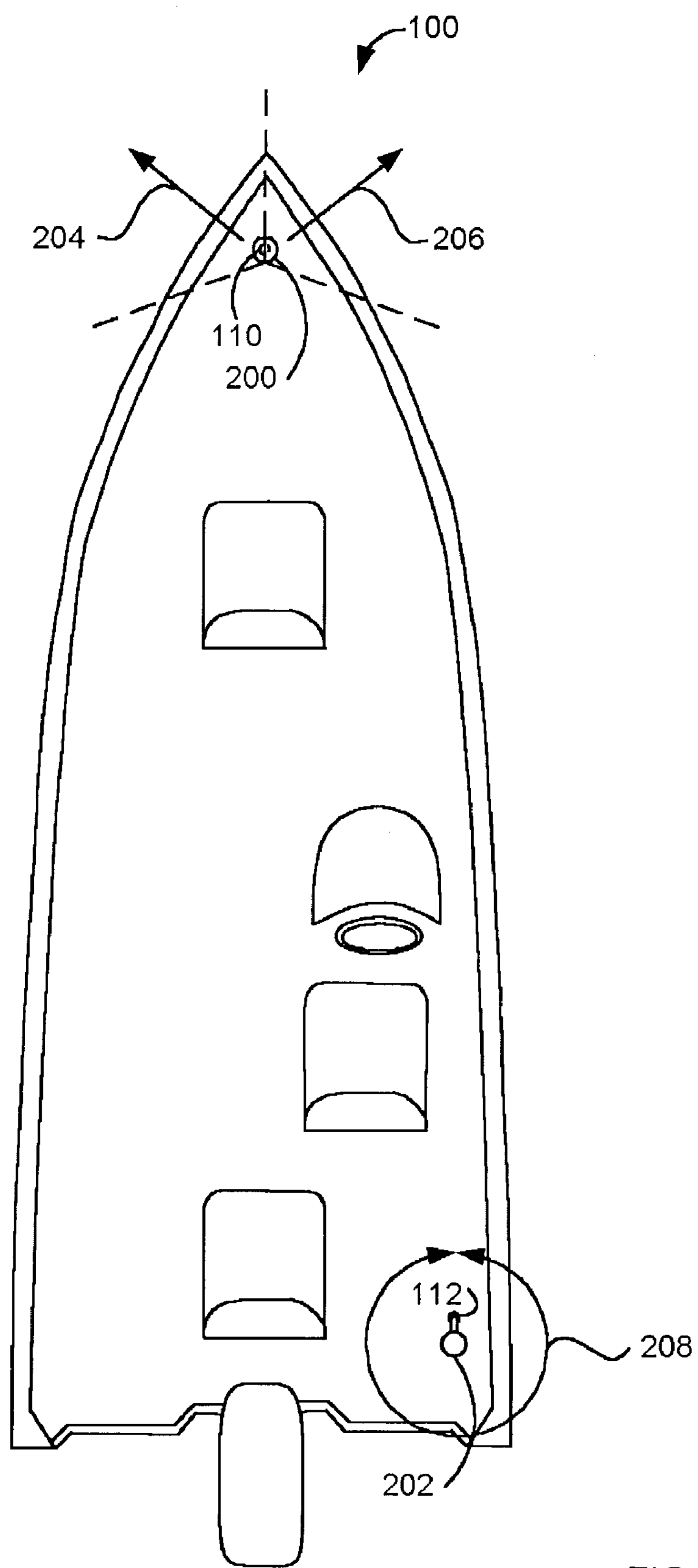
FIG. 2 is a top plan view of the boat of FIG. 1 wherein a known bi-color pole light is installed in the first base of FIG. 1 and a known all-around pole light is installed in the second base of FIG. 1.

FIG. 2 is a top plan view of the boat 100 of FIG. 1 wherein a known bi-color pole light 200 is installed in the base 110 of FIG. 1 and a known all-around pole light 202 is installed in the base 112 of FIG. 1. In FIG. 2 the bi-color pole light 200 emits red light to the left (port) side of the boat 100 in the direction 204, and emits green light to the right (starboard) side of the boat 100 in the direction 206. The all-around pole light 202 emits white light for 360 degrees as indicated by the direction 208.

Figure 3:
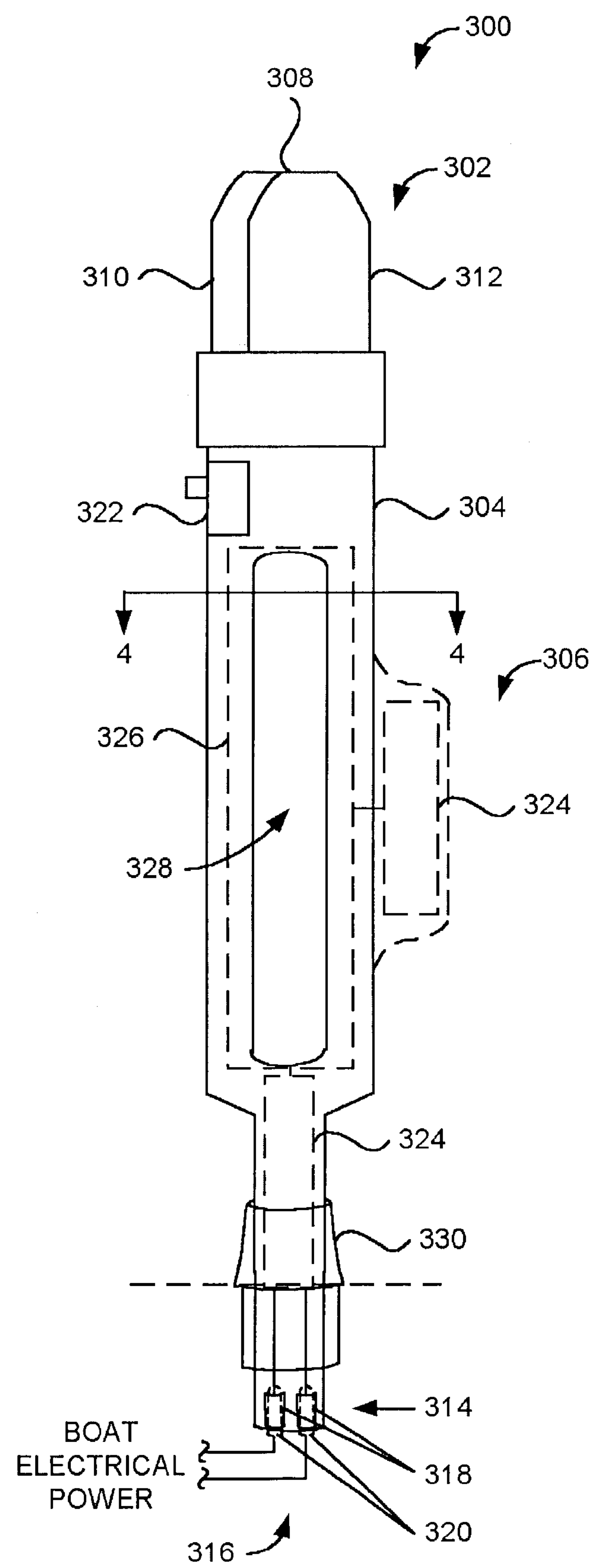
FIG. 3 is a side elevation view of one embodiment of a pole light including a navigation light at one end of a pole and an ultraviolet light source within the pole, and wherein the navigation light is a bi-color light.

FIG. 3 is a side elevation view of one embodiment of a pole light 300 including a navigation light 302 at one end of a pole 304 and an ultraviolet (UV) light source 326 positioned within the pole 304. The pole light 300 is adapted for inserting into a base located at a front (bow) of a boat and having a connector for providing electrical power to the pole light 300 (e.g., the base 110 of the boat 100 of FIG. 1). A UV or black light system 306 of the pole light 300 includes the UV light source 326. When the black light system 306 is turned on, the UV light source 326 emits UV light in an outward direction from the pole 304, thereby illuminating objects around the pole 304 with UV light.

In the embodiment of FIG. 3, the navigation light 302 is a bi-color navigation light having a lens 308 with a red colored portion 310 and a green colored portion 312. The lens 308 is mounted at one end of the pole 304 as shown in FIG. 3.

An electrical connector 314 is located in the other end of the pole 304 labeled 316 in FIG. 3. In the embodiment of FIG. 3, the electrical connector 314 includes two female members 318 for receiving male members 320 of the base. Electrical power provided by the base via the male members 320 is provided to a light fixture of the navigation light 302, located within and surrounded by the lens 308, and to the black light system 306.

In the embodiment of FIG. 3, the black light system 306 includes a switch 322, an electrical power conditioning circuit 324, and the UV light source 326. As described in more detail below, the switch 322 is connected between one of the female members 318 of the electrical connector 314 and the power conditioning circuit 324, and is used to selectively provide electrical power to the power conditioning circuit 324.

The power conditioning circuit 324 is connected between the switch 322 and the UV light source 326. In general, the power conditioning circuit 324 produces electrical voltage and current required by the UV light source 326 for proper starting and operation. As indicated in FIG. 3, the power conditioning circuit 324 may be located within the pole 304 or attached to a side of the pole 304. The pole 304 is preferably formed from a metal (e.g., aluminum), and the power conditioning circuit 324 is preferable thermally coupled to the pole 304.

In typical use, the pole light 300 is inserted into a base of a boat (e.g., the base 110 of the boat 100 of FIG. 1). When the switch 322 is closed, the power conditioning circuit 324 receives direct current (dc) electrical power from an electrical distribution system of the boat via the base and provides electrical voltage and current for proper operation of the UV light source 326.

The pole 304 is substantially a hollow cylinder or tube, and the UV light source 326 is positioned within the pole 304 as shown in FIG. 3 and described above. The pole 304 has a slit 328 adjacent to, and aligned with, the UV light source 326. UV light produced by the UV light source 326 exits the pole 304 through the slit 328.

In general, the UV light source 326 produces UV light having wavelengths between about 200 and approximately 400 nanometers. The UV light source 326 preferably produces UV light having wavelengths in the UV-A region between about 300 and approximately 400 nanometers.

In one embodiment, the UV light source 326 is a cylindrical black light lamp or tube, and the power conditioning circuit 324 is an electronic ballast that receives direct current (dc) electrical power and produces electrical voltage and current required by the black light tube for proper starting and operation. Such electronic ballasts are commonly referred to as dc inverter ballasts.

A typical electronic ballast provides a high voltage pulse to strike an arc in the black light tube, then regulates electrical current provided to the tube after starting. The typical electronic ballast drives the black light tube with high frequency voltage and current waveforms that increase efficiency and eliminate flicker. It is noted that other types of ballasts may be used, including magnetic ballasts.

A typical black light lamp or tube is a glass tube having two tungsten filament cathodes at opposite ends. The tube is filled with mercury vapor and other gases. When a sufficiently high voltage is applied between the two cathodes, an electric arc is produced. The electrons in the arc collide with mercury atoms resulting in the generation and emission of ultraviolet photons.

The filament cathodes of the typical black light tube extend between a pair of pins at each end of the tube. Each of the pairs of pins is adapted to fit into a bi-pin base. The ballast providing electrical power to the black light tube preheats the cathodes to start the tube. This starting method is generally referred as the "rapid start" method.

After the arc is struck within the black light tube during starting, the electrical resistance of the ionized gas within the tube decreases significantly. The ballast controls the electrical current provided to the black light tube after starting such that the tube does not draw excessive electrical power and fail prematurely.

Suitable black light lamps or tubes are commercially available, and include products with general designations F4T5BLB and F6T5BLB manufactured by the Sylvania Corp. (Danvers, Mass.). These black light tubes have widths of about ⅝ inch. While producing less UV light, the F4T5BLB black light tube has an overall length of about 6 inches, and is advantageous for use in a relatively short pole 304. The F6T5BLB black light tube has an overall length of about 9 inches and is advantageous for use in a longer pole 304 as it produces more UV light. Suitable small dc inverter ballasts are commercially available.

In other embodiments the UV light source 326 may be, for example, an array of UV light emitting diodes (LEDs) or one or more incandescent UV light bulbs. The power conditioning circuit 324 may limit the electrical current and/or voltage provided to the UV light source 326 such that the LEDs or the light bulbs do not draw excessive electrical power and fail prematurely.

While black light tubes have acceptably long expected lives (5,000 to 10,000 hours), their glass tubes are vulnerable to damage caused by shock, vibration, and sudden liquid contact. Advantages of UV LEDs over black light tubes include increased ruggedness and longer lives (50,000 to 100,00 hours).

With current UV LED technology it is believed an array of UV LEDs that produces the same UV light output as a suitable black light tube (e.g., the F4T5BLB black light tube or the F4T5BLB black light tube) would include several hundred UV LEDs, may be physically larger than the corresponding black light tube, would cost much more than the corresponding black light tube, and would dissipate more electrical power than the corresponding black light tube. While UV LED arrays may not currently be practical from size, cost, and power dissipation aspects, improvements in UV LED technology over time may make such UV LED arrays practical.

The pole light 300 also includes a sliding member 330 encircling the pole 304. When the end 316 of the pole 304 is inserted into the base of the boat (e.g., the base 110 of the boat 100 of FIG. 1), a lower portion of the sliding member 330 is slid into the base about the pole 304, providing both structural rigidity and a water resistant seal.

Figure 4:
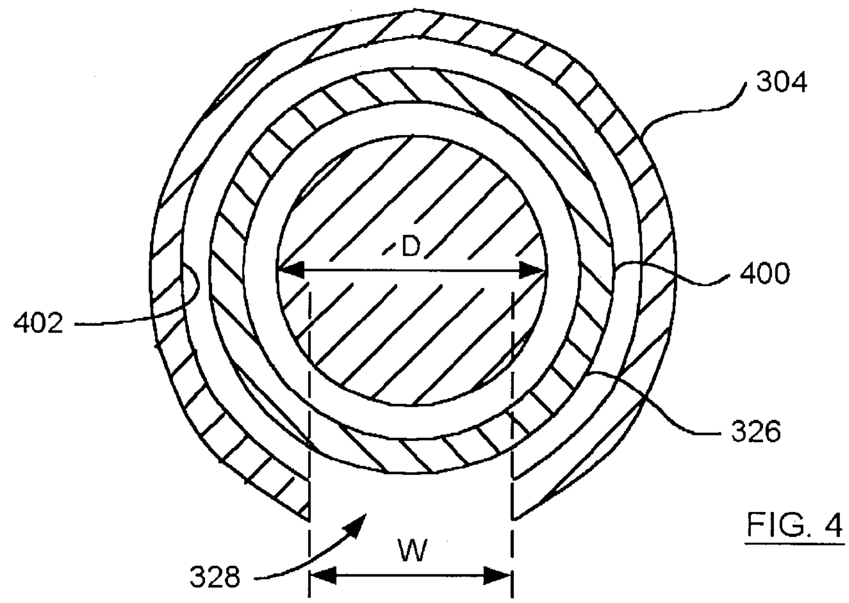
FIG. 4 is a sectional view of the pole light of FIG. 3 as indicated in FIG. 3.

FIG. 4 is a sectional view of the pole light 300 of FIG. 3 as indicated in FIG. 3. As described above, the pole 304 of the pole light 300 is substantially a hollow cylinder or tube, and the UV light source 326 is positioned within the pole 304.

In the embodiments of FIGS. 3 and 4, the UV light source 326 is substantially tubular (e.g., a black light lamp or tube) and a protective sheath 400 surrounds the UV light source 326. The sheath 400 is substantially transparent to UV light, and prevents objects and liquids from coming into contact with the UV light source 326. The sheath 400 may, for example, be formed from a plastic material or a rugged type of glass. Suitable plastic materials include acrylic plastic resins such as Plexiglas® (Atofina Chemicals, Inc., Philadelphia, Pa.) and polycarbonate resins such as Lexan® (General Electric Company, Schenectady, N.Y.). Suitable rugged types of glass includes borosilicate glass such as Pyrexg® (Coming Inc., Corning, N.Y.).

As described above, the pole 304 has a slit 328 adjacent to, and aligned with, the UV light source 326. UV light produced by the UV light source 326 exits the pole 304 through the slit 328. In FIG. 4, the UV light source 326 has a dimension "D" and the slit 328 has a corresponding dimension "W." The dimension W is preferably about 0.8 (D). For example, where the UV light source 326 is either an F4T5BLB or F6T5BLB black light tube, the dimension D is about ⅝ inch, and the dimension W is preferably approximately (0.8)(⅝ inch)=0.5 inch.

An inner surface 402 of the substantially tubular pole 304 is preferably highly reflective to UV light such that most of the UV light produced by the UV light source 326 eventually exits the pole 304 through the slit 328. The pole 304 may be, for example, formed from a metal (e.g., aluminum), and the inner surface 402 of the pole 304 may be polished such that the inner surface 402 is highly reflective to UV light. Alternately, or in addition, the inner surface 402 may be coated with a material that substantially reflects UV light.

Figure 5:
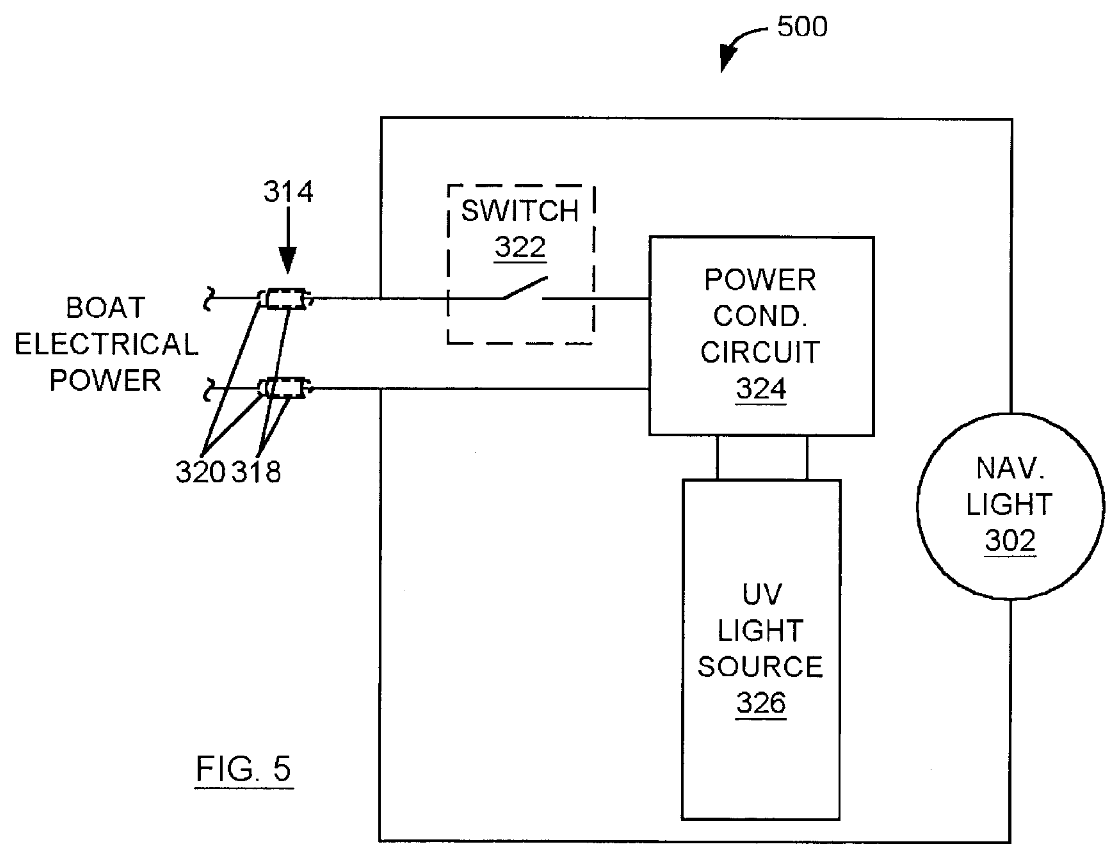
FIG. 5 is a diagram of one embodiment of an electrical circuit of the pole light of FIG. 3.

FIG. 5 is a diagram of one embodiment of an electrical circuit 500 of the pole light 300 of FIG. 3. As described above, the switch 322 is connected between one of the female members 318 of the electrical connector 314 and the power conditioning circuit 324, and is used to selectively provide electrical power to the power conditioning circuit 324. The power conditioning circuit 324 is connected between the switch 322 and the UV light source 326, and produces electrical voltage and current required by the UV light source 326 for proper starting and operation. It is noted that polarity of electrical power provided to the power conditioning circuit 324 may have to be reversed in some applications (e.g., via a polarity switch).

The electrical circuit 500 also includes the navigation light 302 of FIG. 3, wherein the navigation light 302 is a bi-color navigation light. As indicated in FIG. 5, the navigation light 302 is connected between the female members 318 of the electrical connector 314. As described above, the navigation light 302 includes a light fixture located within and surrounded by the lens 308 of FIG. 3. An incandescent light bulb mounted in the light fixture receives electrical power when the pole light 300 is inserted into a base of a boat (e.g., the base 110 of the boat 100 of FIG. 1), and produces white visible light that is filtered by the red colored portion 310 and the green colored portion 312 of the lens 308 of FIG. 3.

Figure 6:
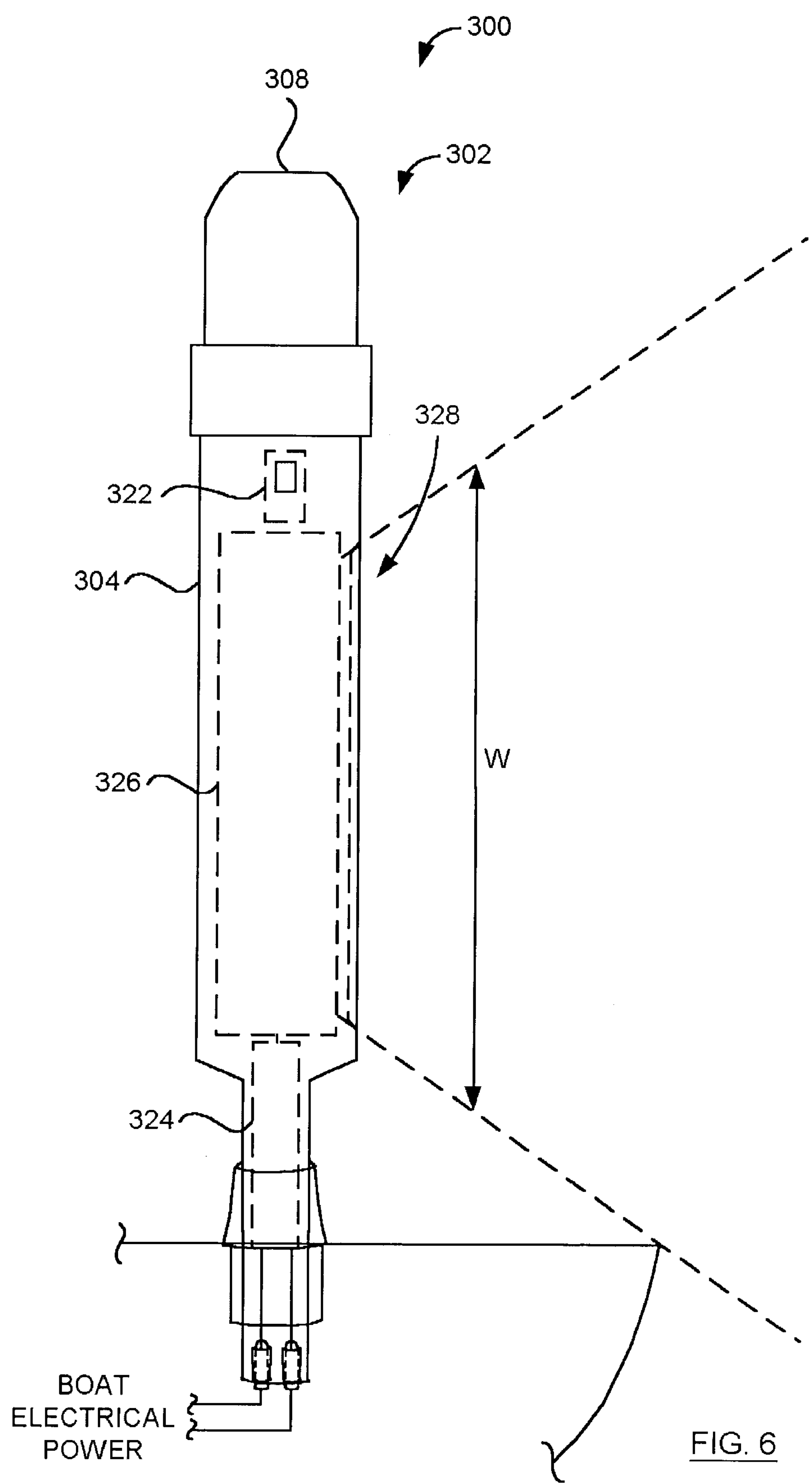
FIG. 6 is a side elevation view of the pole light of FIG. 3 illustrating a relatively wide vertical beam width "W" of the UV light produced by the pole light.

FIG. 6 is a side elevation view of the pole light 300 of FIG. 3 illustrating a relatively wide vertical beam width "W" of the UV light produced by the UV light source 326 and exiting the pole 304 through the slit 328. The relatively wide vertical beam width W, resulting from the substantially vertical installed orientation of the UV light source 326 and the slit 328, is advantageous as a relatively wide vertical area is bathed in UV light. When exposed to the UV light, articles located in the relatively wide vertical area that fluoresce or phosphoresce, such as fishing line, lures, etc., emit visible light, appear to glow brightly, and are highly visible.

Figure 7:
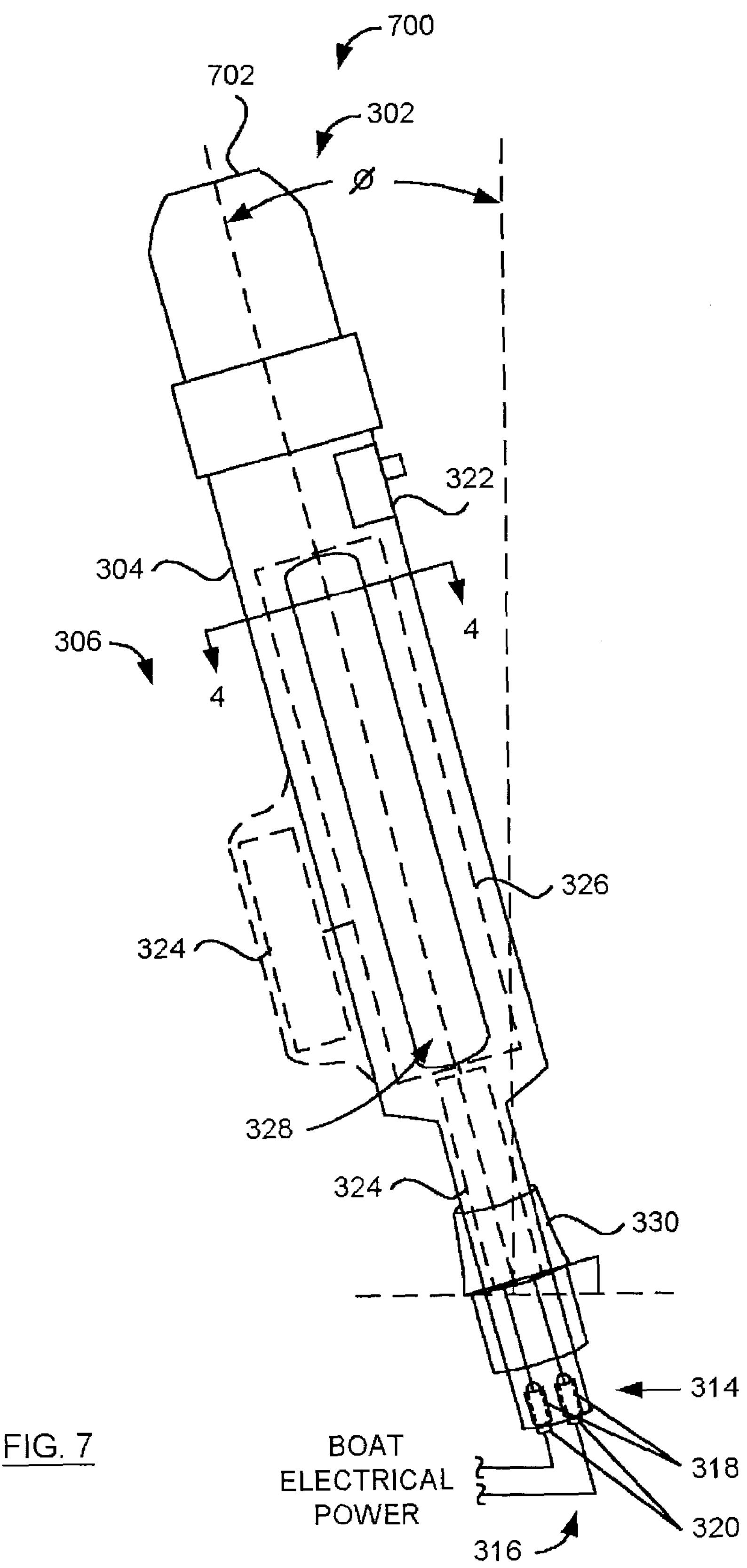
FIG. 7 is a side elevation view of one embodiment of a pole light similar to the pole light of FIG. 3 wherein the navigation light is a white all-around light.

FIG. 7 is a side elevation view of one embodiment of a pole light 700 similar to the pole light 300 of FIG. 3 wherein the navigation light 302 is a white all-around light having a white lens 702. Components of the pole light 700 similar to those of the pole light 300 of FIG. 7 are labeled similarly in FIG. 7. The pole light 700 is adapted for inserting into a base located at a back (stern) of a boat and having a connector for providing electrical power to the pole light 700 (e.g., the base 112 of the boat 100 of FIG. 1). As described in detail above, the black light system 306 of the pole light 700, when turned on, emits ultraviolet light in an outward direction from the pole 304 to illuminate an area around the pole 304.

In the embodiment of FIG. 7, the pole light 700 is mounted at a rake angle $\phi$ where $\phi$ is generally less than 20 degrees. In contemplated embodiments the rake angle $\phi$ is less than 45 degrees. As a result, the UV light source 326 and the slit 328 remain substantially vertically oriented, and the UV light produced by the UV light source 326 and exiting the pole 304 through the slit 328 has a relatively wide vertical beam width. (See FIG. 6.)

In the embodiment of FIG. 7, the light fixture of the navigation light 302 is located within and surrounded by the white lens 702. The incandescent light bulb mounted in the light fixture of the navigation light 302 receives electrical power when the pole light 700 is inserted into the base at the rear (stem) of the boat (e.g., the base 112 of the boat 100 of FIG. 1), and produces white visible light that substantially passes through the white lens 702.

Figure 8:
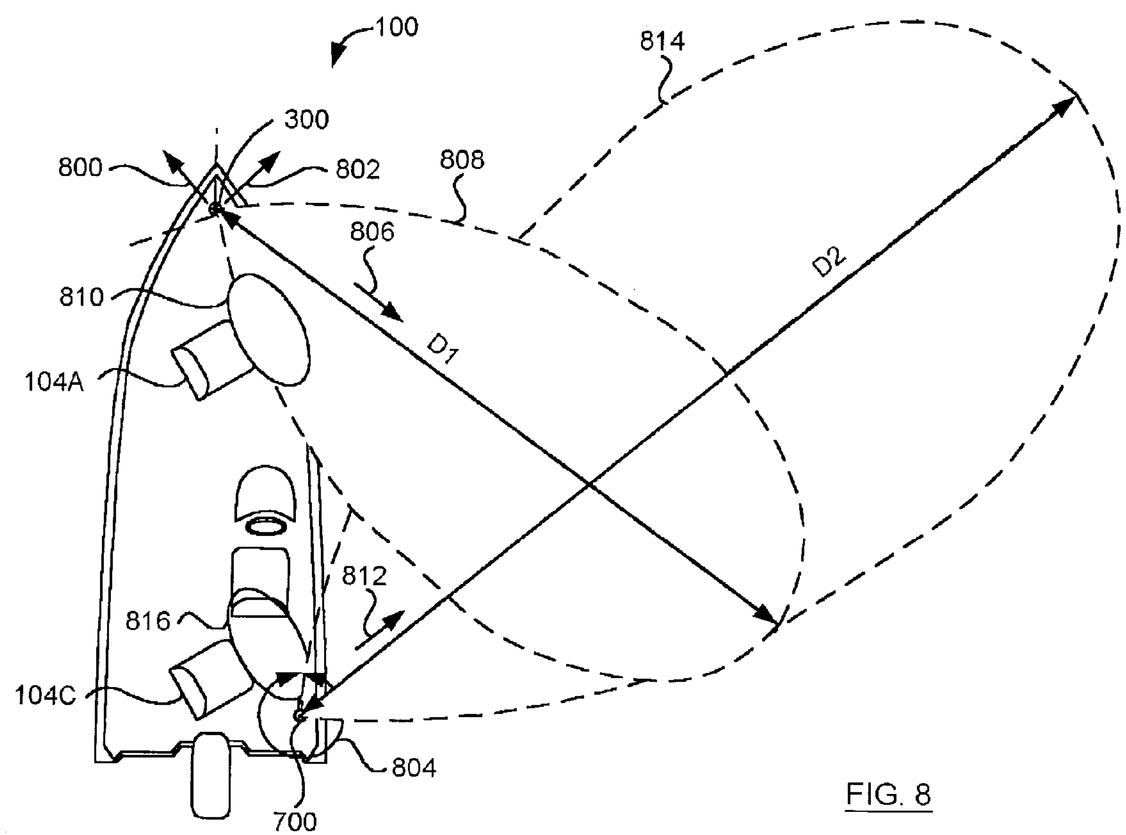
FIG. 8 is a top plan view of the boat of FIG. 1 wherein the pole light of FIG. 3 is installed in the first base and the pole light of FIG. 7 is installed in the second base, and illustrating directions visible light produced by the navigation lights of the pole lights and overlapping UV illumination areas produced by the pole lights.

FIG. 8 is a top plan view of the boat 100 of FIG. 1 wherein the pole light 300 of FIG. 3 is installed in the base 110 of FIG. 1 and the pole light 700 of FIG. 7 is installed in the base 112 of FIG. 1. In FIG. 11 the pole light 300 emits red light to the left (port) side of the boat 100 in the direction 800, and emits green light to the right (starboard) side of the boat 100 in the direction 802. The pole light 700 emits white light for 360 degrees as indicated by the direction 804.

In the embodiment of FIG. 8, the UV light source 326 of the pole light 300 is an F4T5BLB black light tube. The slit 328 in the pole 304 of the pole light 300 is oriented toward the rear (stem) of the boat 100 and toward the right (starboard) side of the boat 100 in the direction 806 shown in FIG. 8. As a result, UV light exiting the slit 328 in the pole 304 of the pole light 300 illuminates an area 808 of water surrounding the boat 100 with UV light. A major dimension "D1" of the area 808 is estimated to be about 15 to 20 feet.

Articles located in the UV illumination area 808 produced by the pole light 300 that fluoresce or phosphoresce, such as fishing line, lures, etc., advantageously emit visible light, appear to glow brightly, and are highly visible. Further, as indicated in FIG. 8, the UV illumination area 808 includes a substantial portion of a work area 810 of a fisherman seated in the seat 104A.

In the embodiment of FIG. 8, the UV light source 326 of the pole light 700 is an F6T5BLB black light tube. The slit 328 in the pole 304 of the pole light 700 is oriented toward the front (bow) of the boat 100 and toward the right (starboard) side of the boat 100 in the direction 812 shown in FIG. 8. As a result, UV light exiting the slit 328 in the pole 304 of the pole light 700 illuminates an area 814 of the water surrounding the boat 100 with UV light. A major dimension "D2" of the area 812 is estimated to be about 20 to 30 feet.

Articles located in the UV illumination area 814 produced by the pole light 700 that fluoresce or phosphoresce, such as fishing line, lures, etc., advantageously emit visible light, appear to glow brightly, and are highly visible. Further, as indicated in FIG. 8, the UV illumination area 814 includes a portion of a work area 816 of a fisherman seated in the seat 104C.

Fishermen seated in the seats 104A and 104C, when fishing the UV-illuminated right (starboard) side of the boat 100, can readily see their own lines as well as the line of the other fisherman, and can prevent the lines from becoming entangled. In addition, the fishermen can readily detect line movement caused by fish running with a bait. Tying or otherwise connecting fishing tackle such as hooks or lures to brightly glowing lines within the work areas 810 and 816 is made easier. Further, depth perception is improved, eye strain and fatigue are reduced, and bothersome insects are less frequent.

In FIG. 8, the pole lights 300 and 700 are used simultaneously, and the UV illumination area 808 produced by the pole light 300 and the UV illumination area 814 produced by the pole light 700 advantageously overlap. However, it is noted that the pole light 300 and the pole light 700 may be used separately.

Figure 9:
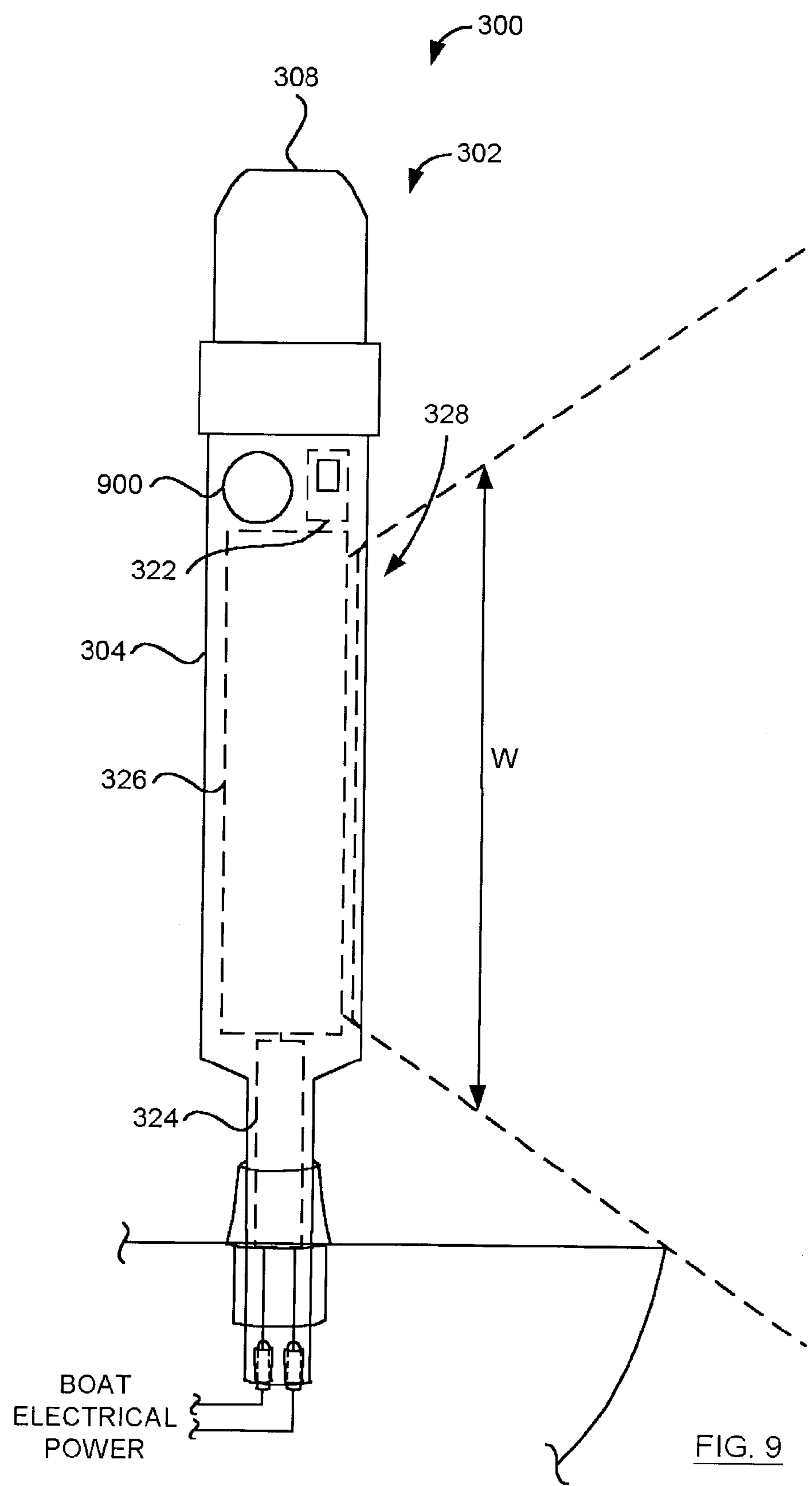
FIG. 9 is a side elevation view of the pole light of FIG. 3 wherein the pole light includes an accessory outlet.

FIG. 9 is a side elevation view of the pole light 300 of FIG. 3 wherein the pole light 300 includes an accessory outlet 900. Components of the pole light 300 shown in FIG. 3 and described above are labeled similarly in FIG. 9. In general, the accessory outlet 900 is an electrical connector for providing electrical power to an accessory such as a cigarette lighter or an spot light. In one embodiment, the accessory outlet 900 is a standard automotive-type 12 volt dc accessory outlet adapted for receiving an electrical cigarette lighter or an accessory plug. The accessory outlet 900 may receive electrical power when the pole light 300 is inserted into the base at the front (bow) of the boat (e.g., the base 110 of the boat 100 of FIG. 1). It is noted that the pole light 700 of FIG. 7 may include a similar accessory outlet.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A pole light, comprising:

a substantially tubular pole having two ends;

a navigation light mounted at one end of the pole;

an electrical connector mounted at the other end of the pole, wherein the other end of the pole is adapted to fit into a base located in a watercraft such that the substantially tubular pole is substantially vertically oriented, and wherein the electrical connector is adapted to receive electrical power via the base;

an ultraviolet light source positioned within the pole; and wherein the pole light is operable to emit ultraviolet light in an outward direction from the pole, wherein the pole has a slit adjacent to, and substantially aligned with, the ultraviolet light source, and wherein the ultraviolet light produced by the ultraviolet light source exits the pole through the slit.

2. The pole light as recited in claim 1, wherein the slit is oriented such that ultraviolet light exiting the slit is directed toward a rear of the watercraft and toward a right side of the watercraft when the other end of the pole is inserted into the base.

3. The pole light as recited in claim 1, wherein the slit is oriented such that ultraviolet light exiting the slit is directed toward a front of the watercraft and toward a right side of the watercraft when the other end of the pole is inserted into the base.

4. The pole light as recited in claim 1, further comprising a sheath substantially surrounding the ultraviolet light source, wherein the sheath prevents objects and liquids from coming into contact with the ultraviolet light source.

5. The pole light as recited in claim 4, wherein the sheath is substantially transparent to ultraviolet light.

6. The pole light as recited in claim 4, wherein the sheath comprises a plastic material or a rugged type of glass.

7. The pole light as recited in claim 1, wherein an inner surface of the pole is adapted to substantially reflect ultraviolet light.

8. The pole light as recited in claim 1, wherein the pole light is adapted for substantially vertical mounting, and as a result a vertical beam width of the ultraviolet light produced by the ultraviolet light source is relatively wide.

9. The pole light as recited in claim 1, further comprising an accessory outlet.

10. A pole light, comprising:

a substantially tubular pole having two ends;

a navigation light mounted at one end of the pole, wherein the navigation light is either a bi-color navigation light or a white all-around light;

an electrical connector mounted at the other end of the pole, wherein the other end of the pole is adapted to fit into a base located in a watercraft, and wherein the electrical connector is adapted to receive electrical power via, the base;

an ultraviolet light source positioned within the pole;

a power conditioning circuit connected between the electrical connector and the ultraviolet light source and configured to provide electrical power to the ultraviolet light source; and wherein the pole has a slit adjacent to, and substantially aligned with, the ultraviolet light source, and wherein ultraviolet light produced by the ultraviolet light source exits the pole through the slit.

11. The pole light as recited in claim 10, wherein the power conditioning circuit provides electrical voltage and current required by the ultraviolet light source for proper starring and operation.

12. The pole light as recited in claim 10, wherein the ultraviolet light source comprises a cylindrical black light lamp or tube, and wherein the power conditioning circuit comprises a ballast.

13. The pole light as recited in claim 12, wherein the ballast comprises a direct current inverter ballast.

14. The pole light as recited in claim 10, wherein the electrical connector comprises two electrical conductor members each adapted to engage a corresponding electrical conductor member of the base.

15. The pole light as recited in claim 10, wherein the navigation light is a bi-color navigation light comprising a lens having a green colored portion and a red colored portion.

* * * * *